(12) United States Patent
Janson (10) Patent No.: US 7,424,924 B2
(45) Date of Patent: *Sep. 16, 2008

(54) HYBRID ELECTRIC VEHICLE POWERTRAIN WITH TORQUE TRANSFER CASE

(75) Inventor: David Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

This patent is subject to a terminal disclaimer.

(21) Appl. No.: 11/276,568

(22) Filed: Mar. 6, 2006

(65) Prior Publication Data

US 2007/0034428 A1 Feb. 15, 2007

Related U.S. Application Data

(63) Continuation-in-part of application No. 11/161,734, filed on Aug. 15, 2005.

(51) Int. Cl.
*B60K 1/00* (2006.01)

(52) U.S. Cl. ............... 180/65.2; 180/65.6; 903/906; 475/5

(58) Field of Classification Search ............ 180/65.2, 180/65.3, 65.6, 65.8, 65.5, 65.4; 903/916, 903/926, 906, 905, 911, 927; 310/75 R, 310/78, 92; 475/5, 6
See application file for complete search history.

(56) References Cited

U.S. PATENT DOCUMENTS

| | | | |
|---|---|---|---|
| 4,405,029 A * | 9/1983 | Hunt | 180/65.2 |
| 4,470,476 A * | 9/1984 | Hunt | 180/65.2 |
| 4,723,624 A | 2/1988 | Kawasaki et al. | |
| 5,461,568 A | 10/1995 | Morita | |
| 6,146,302 A | 11/2000 | Kashiwase | |
| 6,176,808 B1 * | 1/2001 | Brown et al. | 180/65.2 |
| 6,184,603 B1 * | 2/2001 | Hamai et al. | 310/75 R |
| 6,449,552 B2 | 9/2002 | Ohba et al. | |
| 6,464,608 B2 | 10/2002 | Bowen et al. | |
| 6,524,217 B1 | 2/2003 | Murakami et al. | |
| 6,533,692 B1 | 3/2003 | Bowen | |
| 6,533,693 B2 | 3/2003 | Bowen et al. | |
| 6,589,128 B2 * | 7/2003 | Bowen | 180/65.2 |
| 6,617,704 B2 | 9/2003 | Tomikawa | |
| 6,648,785 B2 | 11/2003 | Porter | |
| 6,679,799 B2 | 1/2004 | Bowen | |
| 6,719,656 B2 | 4/2004 | Bowen | |
| 6,881,168 B2 | 4/2005 | Bowen | |
| 6,896,635 B2 | 5/2005 | Tumback | |
| 6,930,405 B2 | 8/2005 | Gunji | |
| 2005/0109550 A1 | 5/2005 | Buglione et al. | |

* cited by examiner

*Primary Examiner*—Hau V Phan
(74) *Attorney, Agent, or Firm*—David B. Kelley; Brooks Kushman P.C.

(57) ABSTRACT

A torque transfer case for a hybrid electric vehicle powertrain with engine and electric power sources is described, the electric power source comprising an electric motor and a battery. It distributes driving power to front and rear traction wheel and axle assemblies to effect all-wheel drive or four-wheel drive as well as regenerative power recovery. The electric power source can be used for engine cranking and the engine can be used for battery charging.

15 Claims, 7 Drawing Sheets

| MODE | CLUTCH A | CLUTCH B | CLUTCH C | POWER BOOST | BRAKE REGENERATION |
|---|---|---|---|---|---|
| 2 HIGH | X | | | TO FRONT WHEELS | FROM FRONT WHEELS |
| 4 HIGH | X | | X | TO ALL WHEELS | FROM ALL WHEELS |
| 4 LOW | | X | X | TO ALL WHEELS | FROM ALL WHEELS |

Fig. 5

| MODE | CLUTCH A | CLUTCH B | CLUTCH C | POWER BOOST | BRAKE REGENERATION |
|---|---|---|---|---|---|
| HIGH AWD | X | | | TO FRONT WHEELS | FROM FRONT WHEELS |
| HIGH LOCKED 4WD | X | | X | TO ALL WHEELS | FROM ALL WHEELS |
| LOW LOCKED 4WD | | X | X | TO ALL WHEELS | FROM ALL WHEELS |

HYBRID ELECTRIC VEHICLE POWERTRAIN WITH TORQUE TRANSFER CASE

CROSS-REFERENCE TO RELATED APPLICATIONS

This application is a continuation-in-part of co-pending U.S. application Ser. No. 11/161,734 filed Aug. 15, 2005, which is assigned to the assignee of the present application.

BACKGROUND OF THE INVENTION

1. Field of the Invention

The invention relates to hybrid electric vehicle powertrains having all-wheel drive and four-wheel drive capabilities.

2. Background Art

Known transmission designs for hybrid electric vehicles typically include torque transmitting gearing to establish torque delivery from dual power sources (i.e., an engine and an electric motor) to vehicle traction wheels. The torque transmitting gearing may have a fixed ratio or more than one ratio depending upon its configuration. The motor, which is electrically coupled to a generator, can be connected to the traction wheels through a torque flow path in parallel disposition with respect to a torque flow path from the engine. A planetary gear unit may be used to establish the torque flow paths for the engine and the motor. A battery sub-system acts as an energy storage system for the generator and the motor. A hybrid electric vehicle powertrain of this type is disclosed in co-pending patent application Ser. No. 10/605,313, filed Sep. 22, 2003, which is assigned to the assignee of the present invention. Reference may be made to that co-pending application to supplement the present disclosure. That co-pending application is assigned to the assignee of the present invention.

Because of the speed ratio of the gearing in a powertrain of the type disclosed in the co-pending application, the generator speed can be varied to achieve control of the engine speed so that the engine may operate at its most efficient brake specific fuel consumption point. The gearing divides engine power output into a mechanical power flow path and an electrical power flow path to a power output driveshaft for an axle assembly for a pair of traction wheels. The operating characteristic of the powertrain of the co-pending patent application has a functional similarity to the characteristic of a conventional continuously variable transmission in an automotive vehicle powertrain that does not rely upon battery power.

It is possible for a powertrain of the type shown in the co-pending application to use motor and battery power independently of the engine to power the vehicle.

Unlike the powertrain disclosed in the co-pending application, which is characterized as a two-wheel drive powertrain, an all-wheel drive hybrid electric vehicle powertrain is disclosed in co-pending patent application Ser. No. 10/747,429, filed Dec. 29, 2003, which also is owned by the assignee of the present invention. The invention disclosed in that co-pending patent application includes a traction motor disposed on a front wheel axis of the vehicle, thereby providing driving torque to the vehicle front wheels as engine power and generator power are distributed through divided power flow paths to the rear traction wheels.

U.S. Pat. No. 6,648,785 shows a hybrid electric vehicle powertrain configuration with four-wheel drive capability in which a torque transfer case distributes power from a multiple ratio power transmission to both the front and rear axles for the vehicle traction wheels. It includes an electric motor/generator as well as an internal combustion engine. Unlike the powertrains discussed in the preceding paragraphs, wherein an electric motor/generator and the engine can be used either separately as a power source or in combination for delivering power through parallel power flow paths to the traction wheels, the invention of the '785 patent includes a transfer case with two power output elements that are connected separately to a secondary driveshaft for the front traction wheels and the primary driveshaft for the rear traction wheels. Planetary gearing is used to augment the torque distributed to the secondary driveshaft from the electric motor. Engine power can be distributed to either or both of the driveshafts.

SUMMARY OF THE INVENTION

The present invention comprises a hybrid electric vehicle powertrain having either all-wheel drive characteristics or four-wheel drive characteristics. For purposes of this disclosure, an "all-wheel drive powertrain" can be defined as a powertrain capable of delivering power from either a single power source or a dual power source with torque being distributed simultaneously to each of the four traction wheels through selectively controllable clutches. Typically a so-called center differential would be used to divide driving torque between forward and rearward traction wheels. The all-wheel drive characteristics of a hybrid electric vehicle powertrain include a capability for recovering regenerative braking energy from each of the forward and rearward traction wheels for storage in a battery that forms a part of the electric drive portion of the powertrain.

The term "four-wheel drive powertrain" for purposes of this disclosure, can be defined as a powertrain in which driving torque, in the case of a hybrid electric vehicle powertrain, is distributed selectively from an electric power source and an engine, together or independently, to the front and rear traction wheels. A selectively engageable clutch system is used to establish either a two-wheel drive capability or a four-wheel drive capability depending upon an engagement and release pattern for the clutches.

In one embodiment of the present invention, the powertrain has a part-time four-wheel drive capability. Engine power, complemented by power from the electric power source, can be delivered through a multiple ratio transmission to a range coupler having two selectively engageable clutches, one of which connects the transmission output shaft to a planetary torque multiplication unit, which in turn delivers driving torque from the transmission output shaft, located on a first axis, which is the engine axis, to a driveshaft for the front traction wheel and axle assembly located on a second axis in spaced parallel disposition with respect to the first axis. The planetary torque multiplication gear unit may be a simple planetary gear unit.

The driving power delivery from the engine, complemented by power from the electric power source, is through a torque transfer cross-drive. The gearing is capable of a high range operating mode or a low range operating mode, depending upon a range coupler clutch selection. The range coupler can connect the transmission output shaft to the driveshaft for the rear traction wheel and axle assembly to effect a mechanical torque flow path.

A four-wheel drive 4×4 coupler is used to deliver transmission output shaft torque to one element of a planetary gearset, another element of the planetary gearset being connected to the motor.

In a second embodiment of the present invention, driving power is distributed from a transmission output shaft on a first axis through a range coupler with selectively engageable clutches and through a torque-splitter differential gear unit to a rear traction wheel and axle assembly. The torque splitter differential gear unit may be a compound planetary gear unit. The portion of the driving power that is not distributed to the rear traction wheel and axle assembly is distributed to a front traction wheel and axle assembly. The range coupler distributes torque from the transmission output shaft to the torque input element of a torque multiplying gearset, which in turn delivers power to the front traction wheel and axle assembly through a torque transfer cross-drive with a torque output member on a second axis. The range coupler clutches establish each of two speed ratios, a high ratio and a low ratio. Regenerative braking energy is recovered from the front traction wheels.

In the second embodiment, power is distributed, during operation in a first mode, to each of the traction wheels, and regenerative braking energy can be recovered from the front traction wheels for storage in the hybrid electric vehicle powertrain battery. In second and third operating modes, respectively characterized by a high ratio and a low ratio, regenerative braking energy can be recovered from both the front and rear traction wheels. The power delivered by the engine can be boosted using electric motor power, which is distributed to both the front traction wheels and the rear traction wheels or to the front traction wheels only depending upon the range coupler clutch selection.

The torque-splitter differential gear unit of the second embodiment may be a compound planetary gear unit with a 4×4 coupler clutch for selectively connecting two elements of the differential gear unit to lock-up the gear unit. It is characterized by a torque split between the rear and front traction wheel and axle assemblies with a ratio that may be about 50:50.

In a third embodiment, the torque-splitter differential gear unit may be a simple planetary gear unit with a 4×4 coupler clutch for connecting the planetary sun gear to the planetary ring gear to lock-up the gear unit. It is characterized by a torque split between the rear and front traction wheel and axle assemblies with a ratio that may be about 60:40.

A cross-drive in the form of a drive chain and sprocket assembly may be used in the first, second, and third embodiments to transfer power from the planetary gearing to the front traction wheel and axle assembly. In fourth and fifth embodiments, the cross-drive is a geared torque flow path having at least one torque input gear located on a first axis that is common to a torque input shaft and a torque output shaft for the rear traction wheel and axle assembly. At least one idler gear drivably connects the torque input gear and a cross-drive torque output gear on a second axis that is offset from the first axis. The idler gear or gears are located on a third axis.

In the fourth and fifth embodiments, the engine may be removed from the powertrain power delivery paths. The engine may be turned off at this time. The clutch system includes an additional clutch that controls the gearing in a power flow path from the single power source or from the dual power source. With the engine removed from the power delivery paths, either two-wheel electric drive or a four-wheel drive can be achieved depending upon whether the additional clutch is engaged.

The additional clutch can be disengaged to permit the engine to be cranked during engine starting as the motor uses battery power to start the engine. If the engine must be started during torque delivery to the traction wheels, provision is made for slipping the additional clutch. The motor will have reserve capacity for developing power at the traction wheels and for cranking the engine. Further, when the engine must be used to charge the battery, the additional clutch is disengaged. At that time, the motor acts as a generator.

Although the embodiments of the invention presently disclosed include a driving connection between a torque output member of a cross-drive and a front vehicle differential and axle assembly and a driving connection between a transfer case torque output shaft on the engine axis and a rear vehicle differential and axle assembly, the driving connections could be reversed. Thus the torque output shaft of the cross-drive could drive the rear differential and axle assembly and the torque output shaft in the engine axis could drive the front differential and axle assembly.

DETAILED DESCRIPTION OF THE PREFERRED EMBODIMENTS

Figure 1:
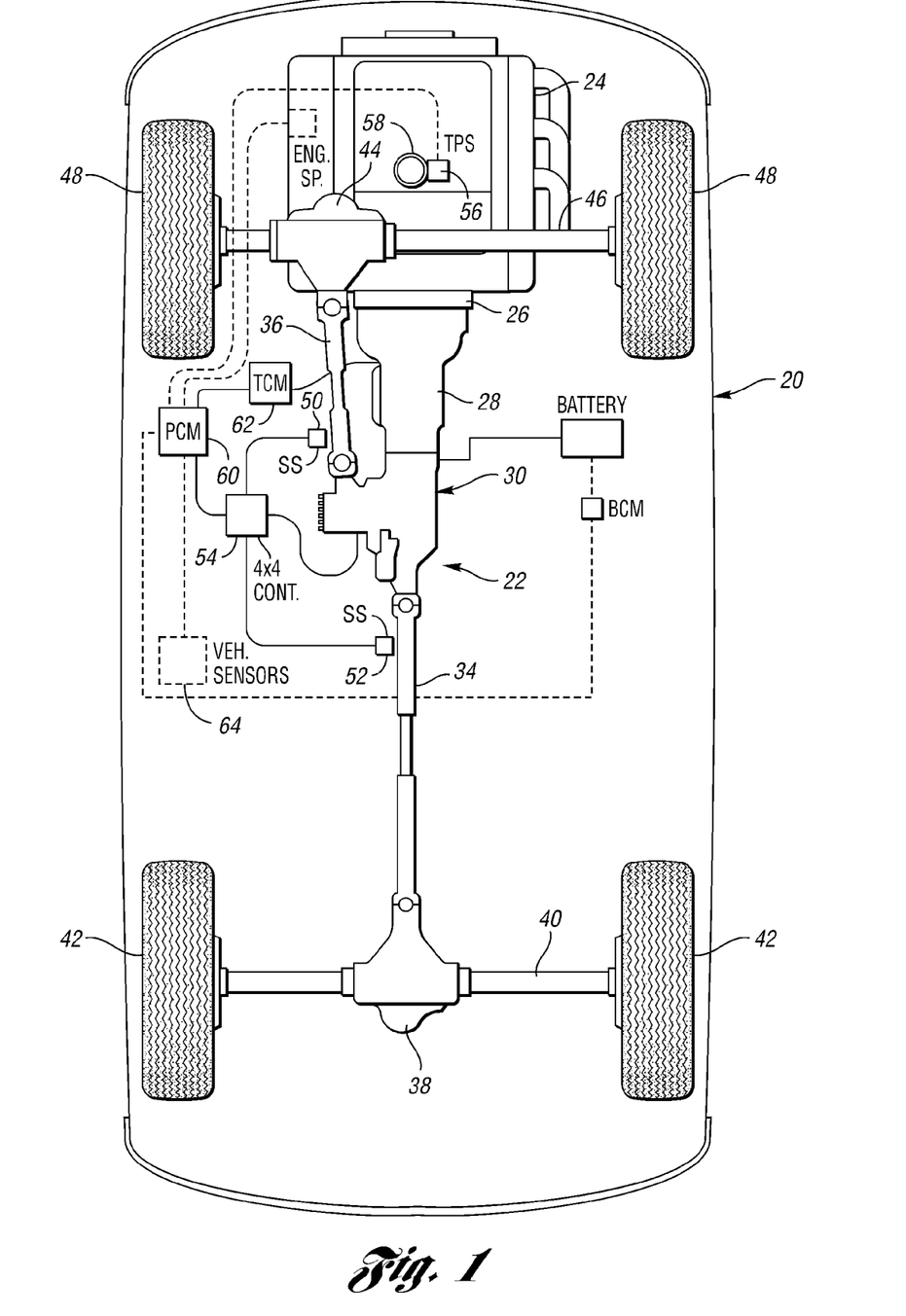
FIG. 1 is a schematic representation of a hybrid electric vehicle powertrain with an engine, a multiple-ratio transmission, a front traction wheel axle assembly, a rear traction wheel axle assembly and a transfer case, including an electric motor, for transferring torque to a front traction wheel and axle assembly.

A hybrid electric vehicle is shown at 20 in FIG. 1. It has a vehicle driveline 22, including an engine 24 engaged with a torque converter 26, which in turn is engaged with a power input element of an automatic transmission 28. As an alternative, the torque converter and the automatic transmission can be replaced with a friction clutch and a manual transmission, but this configuration will not be described here because these components are conventional and well known in the art.

The automatic transmission 28 is engaged with the torque input of a torque transfer case 30. It is connected to a rear axle (primary) driveshaft 34 and a front axle (secondary) driveshaft 36. The rear axle driveshaft 34 is coupled to a rear differential 38, which is connected to a rear (primary) axle 40. Axle 40, in turn, is connected to a pair of rear traction wheels and tires 42. The front driveshaft 36 is coupled to a front differential 44, which is connected to a front (secondary) axle 46. Axle 46, in turn, is connected to a pair of front traction wheels and tires 48.

A front driveshaft speed sensor 50 is located to sense the rotational speed of the front driveshaft 36. A rear driveshaft speed sensor 52 is located to sense the rotational speed of the rear driveshaft 34. The outputs of the front speed sensor 50 and the rear speed sensor 52 are input to a 4×4 powertrain control module 54. Alternatively, a pair of front speed sensors (not shown), each one being associated with a different one of the front wheels 48, can measure the speed of each of the front wheels 48. In that case, an average of the two wheel speeds is used instead of the speed of the secondary driveshaft 36. Also, alternatively, a pair of rear speed sensors (not shown), each one being associated with a different one of the rear wheels 42, can measure the speed of each of the rear wheels 42. In that case, an average of the two wheel speeds is used instead of the speed of the primary driveshaft 34. In any event, the speed of the front driveshaft 36 and the rear driveshaft 34 can be determined.

The 4×4 control module 54 controls clutches within transfer case 30. The clutches will be described subsequently. The transfer case distributes variable percentages of torque to the front driveshaft 36 and the rear (primary) driveshaft.

A throttle position sensor 56, which is mounted on a throttle body 58 on the engine 24, measures the throttle angle (throttle opening) and sends a throttle position output (TPS) signal to a powertrain control module (PCM) 60. The PCM 60 may apply error corrections to the TPS signal before sending the TPS signal to the 4×4 control module 54. The TPS is measured from zero percent, which is the throttle closed position, to one hundred percent, which is full open throttle position. The PCM 60 is also in communication with a transmission control module (TCM) 62, which controls the operation of the automatic transmission 28.

FIG. 1 shows schematically at 64 vehicle sensors, in addition to an engine speed sensor and those specifically illustrated in FIG. 1 at 50, 52 and 56, that would be used in controlling the transfer case 30 and transitions from one operating mode to the other. These sensors provide input data for the control modules 54, 60 and 62.

Figure 1A:
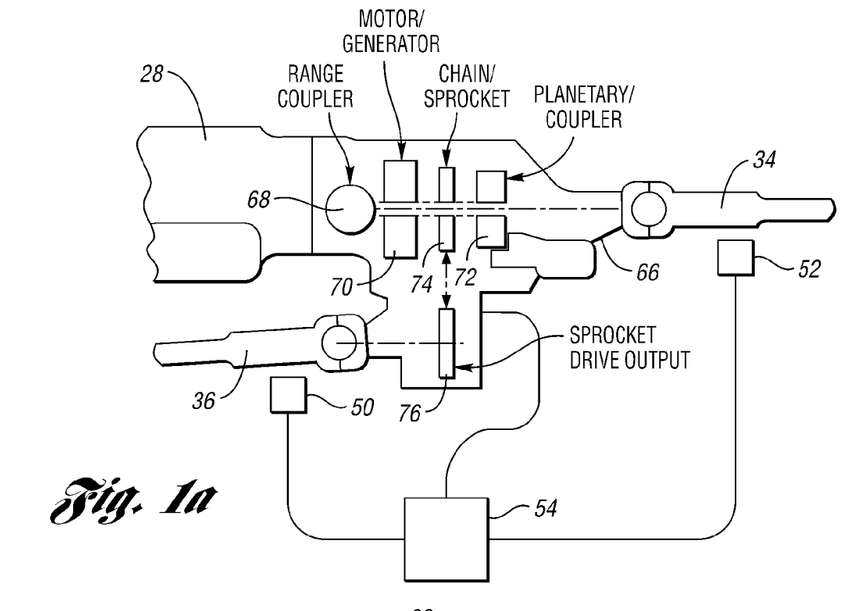
FIG. 1*a* is an enlarged schematic view of the transfer case illustrated in FIG. 1.

FIG. 1a shows in general schematic form the principal components of the transfer case that will be described more particularly with reference to FIGS. 2, 3 and 4. The transfer case includes a housing 66, which is bolted or otherwise secured to the rearward end of transmission 28. The output shaft of transmission 28 distributes power to a range coupler 68, which distributes torque to the rotor of a motor/generator 70 and to planetary gearing for a torque divider or differential and to torque multiplying gearing generally located at 72.

A chain and sprocket assembly 74 is disposed between the planetary gearing 72 and the motor/generator 70. The chain and sprocket assembly includes a chain transfer drive or cross-drive to a power output drive sprocket 76, which is mechanically coupled to the secondary driveshaft 36 through a universal joint. As schematically shown, the gearing 72 is connected also to a torque output shaft that in turn is connected through the universal joint to primary axle driveshaft 34.

Figure 2:
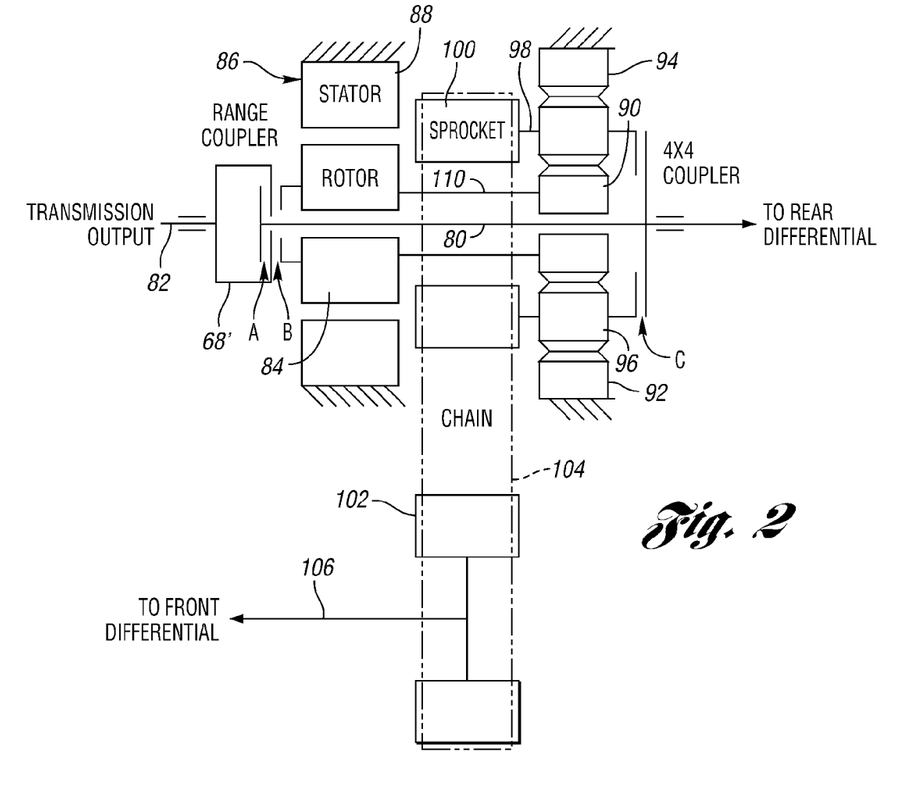
FIG. 2 is a schematic diagram of the elements of a first embodiment of the invention, which is characterized by a part-time, four-wheel drive capability.

As seen in FIG. 2, the transfer case includes range coupler 68', which comprises a first clutch A and a second clutch B. Clutch A functions to connect torque output shaft 80 to a transmission torque output shaft 82. Clutch B, when it is activated, connects the transmission output shaft 82 to a rotor 84 of a motor/generator unit 86. The motor/generator unit 86 includes a stator that is fixed to the transfer case housing, as shown at 88. The motor/generator rotor is connected through sleeve shaft 110 to sun gear 90 of planetary gearing 92. Ring gear 94 of gear unit 92 is fixed to the transfer case housing. Planetary pinions 96 rotatably supported on carrier 98 engage ring gear 94 and sun gear 90.

Drive sprocket 100, which is journalled on the axis of the transmission output shaft, is part of a chain transfer drive or cross-drive that includes driven sprocket 102 and cooperating drive chain 104. Sprocket 102 is journalled in the transfer case housing and is connected drivably to power output shaft 106 for the secondary, front traction wheel and axle wheel assembly.

A 4×4 coupler clutch C connects drivably the output shaft 80 with the carrier 98 of the planetary gearing 92. Since the ring gear 94 of the planetary gearing 92 is fixed to the transfer case housing, sun gear 90 is over-driven with respect to output shaft 80.

Clutches A, B and C may be fluid pressure actuated friction clutches, mechanical synchronizer clutches or positive-drive dog clutches depending upon a design choice.

In the part-time, four-wheel drive configuration of FIG. 2, engine torque can be distributed mechanically to the primary traction wheel and axle assembly. If the motor/generator 86 is energized at this time, motor torque is distributed to sun gear 90 and is multiplied by the planetary gearing 92 to drive sprocket 100. This effects torque delivery from the motor to the secondary differential and axle assembly. This condition is indicated as a two-wheel high operating mode in the chart of FIG. 5. In that mode, regenerative braking torque from the front traction wheels may take place.

Figure 5:
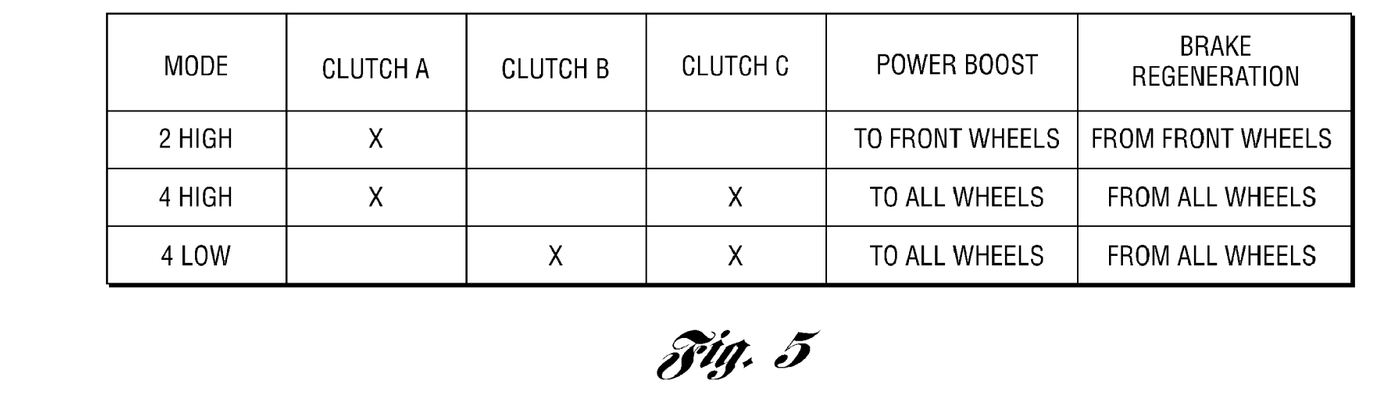
FIG. 5 is a chart showing the operating modes for a part-time, four-wheel drive powertrain embodying the invention.

If clutch A remains engaged and clutch C is simultaneously applied, the electric motor power boost can be distributed to all four traction wheels for the embodiment of FIG. 2, as indicated in FIG. 5. This is referred to in FIG. 5 as a four-wheel drive high operating mode. Regenerative braking in that mode is available from all four traction wheels.

If clutch A is released and clutch B is applied while maintaining clutch C applied, engine torque can be distributed through clutch B and through sleeve shaft 110 to sun gear 90. Gearing 92 then multiplies sun gear torque as power is distributed to the rear traction wheel and axle assembly. Motor/generator electric power complements engine power as the torque on the rotor 84 drives sun gear 90. A power boost for all four traction wheels is available in the four-wheel high drive mode as well in the four-wheel low drive mode.

As indicated in the chart of FIG. 5 for the embodiment of FIG. 2, regenerative braking torque can be developed from all traction wheels for both the four-wheel high operating mode and the four-wheel low operating mode.

In addition to the drive modes described in the preceding paragraphs, clutches A and B can both be released in some special circumstances, which removes the engine from the power delivery paths and establishes a front-wheel, fully-electric drive with clutch C disengaged. The engine may be turned off at this time. If clutch C is engaged, the powertrain becomes a four-wheel, fully-electric drive.

Figure 3:
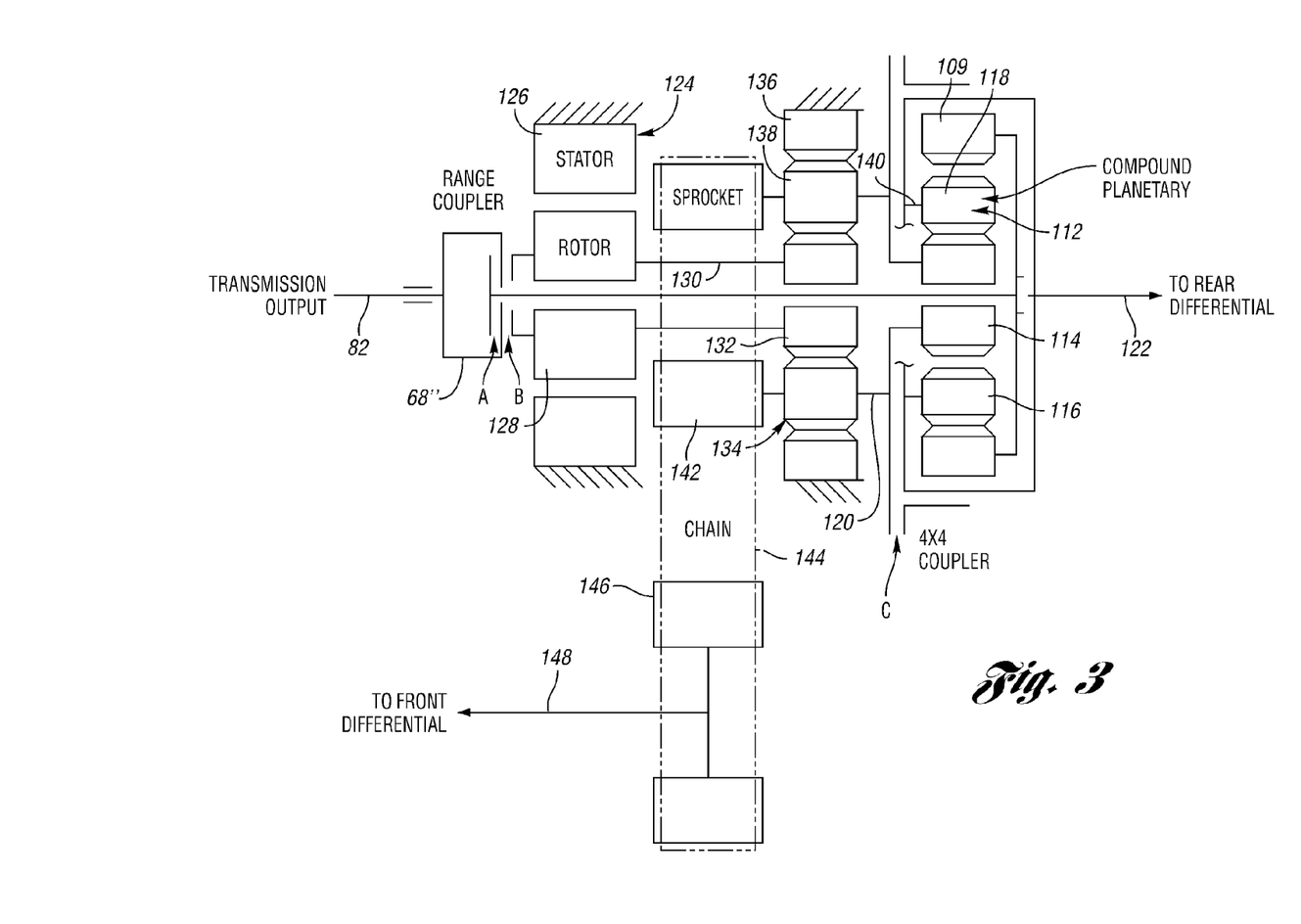
FIG. 3 is a schematic representation of the hybrid electric vehicle powertrain of the invention with an all-wheel drive characteristic and with a 50/50 torque split between the front traction wheels and the rear traction wheels.

The embodiment of the invention shown in FIG. 3 has all-wheel drive characteristics. It may have a torque split of about 50:50 for the primary and secondary driveshafts. The range coupler shown at 68", like the range coupler 68' of the embodiment of FIG. 2, has two clutches, shown at A and B. Clutch A, when engaged, distributes torque from the transmission output shaft 82 to ring gear 109 of a compound planetary gear unit 112. Gear unit 112 includes sun gear 114, a first set of planetary pinions 116 and a second set of planetary pinions 118. The pinions 116, which engage pinions 118 and ring gear 109, are carried by a common planetary carrier 140 connected to power output shaft 122, which distributes power to the primary differential and axle assembly. Pinions 118 engage sun gear 114.

A motor/generator unit 124 has a stator 126 fixed to the transfer case housing and a rotor 128 connected through sleeve shaft 130 to sun gear 132 of planetary gear unit 134.

The planetary gear unit 134, which is a torque multiplier, includes a stationary ring gear 136 secured to the transfer case housing, and planetary pinions 138 rotatably supported by carrier 120. Pinions 138 engage sun gear 132 and ring gear 136. The carrier 140 acts as a torque output member. It is connected to drive sprocket 142. A drive chain 144 transfers power to a driven sprocket 146, which in turn is connected drivably to power output shaft 148 for the secondary traction wheel and axle assembly.

As in the case of the embodiment of FIG. 2, the embodiment of FIG. 3 includes a 4×4 coupler C, which, when engaged, connects the sun gear 114 to the compound carrier 140. With clutch C disengaged and clutches A and B disengaged, the engine is removed from the power delivery paths. The engine may be turned off at this time and the powertrain functions as front-wheel, fully-electric drive. If clutch C is engaged, the powertrain becomes a four-wheel, fully-electric drive.

The carrier 120 of the planetary gear unit 134 is connected to the sun gear 114 of the compound planetary gear unit 112. The planetary gear unit 112 acts as a torque splitting differential, which divides torque equally with a 50/50 torque split between the shafts 122 and 148 when 4×4 coupler clutch C is disengaged.

Figure 6:
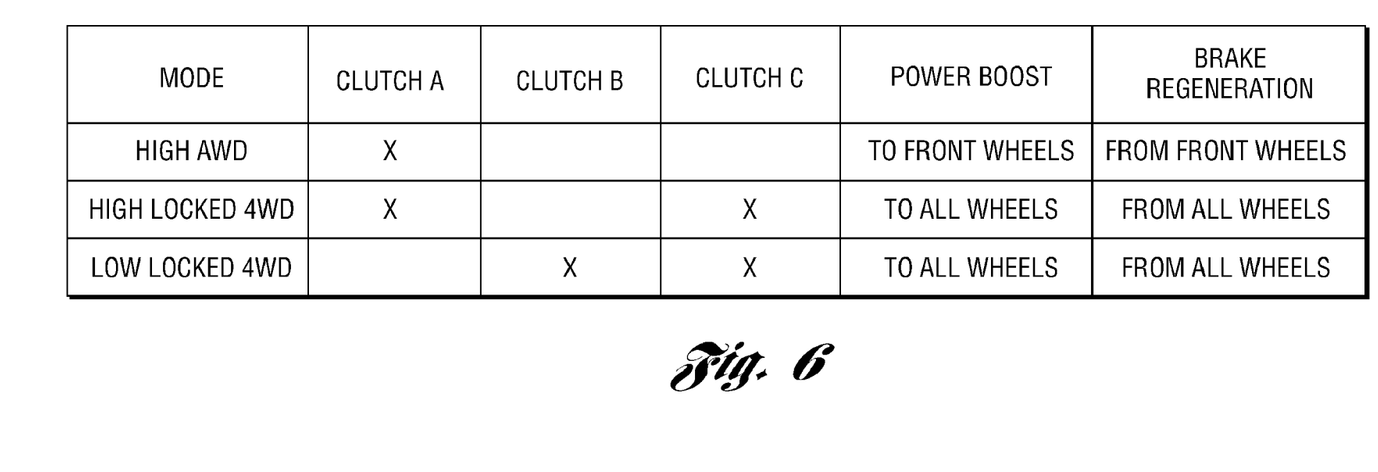
FIG. 6 is a chart showing the operating modes for both the powertrain configuration of FIG. 3 and the powertrain configuration of FIG. 4.

The operating modes for the embodiment of FIG. 3 are indicated in the chart of FIG. 6. An all-wheel drive high operating mode is achieved by engaging clutch A, which drives ring gear 109 of the compound planetary gearing 112 through center shaft 111. Sun gear torque for sun gear 114 is distributed to the carrier for gear unit 134, which drives sprocket 142. In the case of the high all-wheel drive mode illustrated in FIG. 6, a power boost then is distributed to the front wheels as the sun gear 132 drives sprocket 142. Regenerative braking in this mode can be generated by the front wheels.

To achieve a high, locked four-wheel drive operating mode for the embodiment of FIG. 3, clutch A remains applied and clutch C also is applied, which locks carrier 140 to sun gear 114 of the planetary gear unit 112. Under these conditions, motor power can be distributed to all of the traction wheels. Also, regenerative braking from all of the traction wheels is possible.

A low ratio, locked four-wheel drive operating mode is achieved by disengaging clutch A and engaging clutch B while clutch C remains applied. Electric motor power then can be distributed to all four traction wheels and regenerative braking also can be achieved from all four traction wheels.

Figure 4:
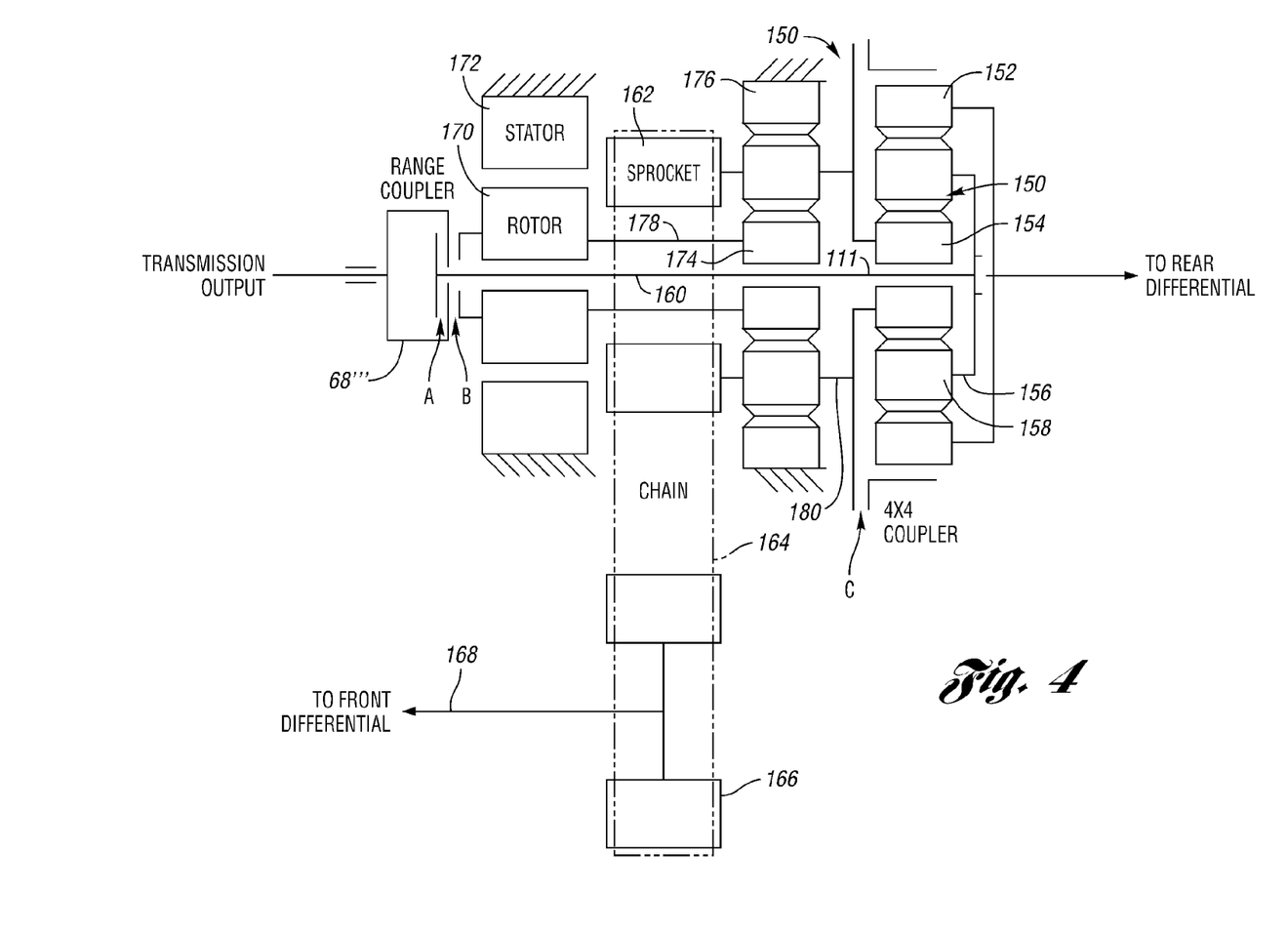
FIG. 4 is a schematic representation of another embodiment of the invention having an all-wheel drive characteristic with a 60/40 torque split between the rear traction wheels and the front traction wheels, respectively.

In the embodiment of FIG. 4, which also has all-wheel drive characteristics, torque is distributed to each of the four traction wheels, but the torque split is made with the ratio that may be about 60:40 rather than a ratio that may be about 50:50. This difference in the torque split is obtained by using a simple planetary torque splitter 150 rather than the compound planetary torque splitter 112 of FIG. 3. The 4×4 coupler clutch C of the embodiment of FIG. 4 selectively connects sun gear 154 to ring gear to lock-up the gear unit 150.

In the embodiment of FIG. 4, the simple planetary torque splitter comprises a ring gear 152, a sun gear 154 and a planetary carrier 156. Planetary pinions 158 are rotatably supported on the carrier 156. Torque is distributed to the carrier 156 through shaft 160 when clutch A is applied.

As in the case of the embodiment of FIG. 3, the embodiment of FIG. 4 includes a torque multiplier planetary gear unit located between the torque splitter gearing and a drive sprocket for the front differential and axle assembly. The drive sprocket of FIG. 4 is shown at 162, which is connected through a chain 164 to a driven sprocket 166. The front traction wheel and axle assembly is connected to the driven sprocket 166 through a torque output shaft 168. Furthermore, rotor 170 of a motor 172 is connected to sun gear 174 of the torque multiplier gear unit. Pinions 158 carried by carrier 180 engage ring gear 176 of the torque multiplier gear unit.

Rotor 170 is connected drivably to sun gear 174 through sleeve shaft 178. Carrier 180 of the torque multiplier gear unit is connected to drive sprocket 162 and to sun gear 154 of the gear unit 150. Pinions of the torque multiplier gear unit engage ring gear 176 and sun gear 174.

The mode chart of FIG. 6 is applicable to the configuration shown in FIG. 4 as well as to the configuration shown in FIG. 3. As in the case of the embodiment of FIG. 3, a motor power boost for the embodiment of FIG. 4 can be distributed to the front wheels in the high all-wheel drive operating mode and to all of the wheels during operation in both the four-wheel locked high operating mode and the four-wheel low locked operating mode. Regenerative braking torque is distributed from the front wheels in the case of the high all-wheel drive operating mode and from all four wheels in the case of the four-wheel drive high locked operating mode and the four-wheel drive low locked operating mode.

Figure 7:
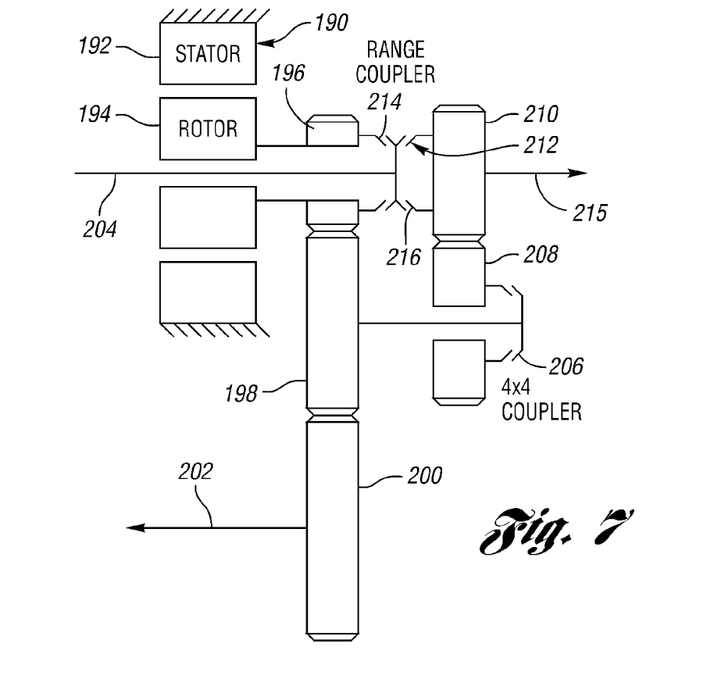
FIG. 7 is a schematic representation of a hybrid electric vehicle powertrain comprising a layshaft four-wheel drive configuration with drive characteristics similar to the drive characteristics of the embodiment of FIG. 2.

The embodiment of FIG. 7 has characteristics that are similar to the embodiment of FIG. 2. It includes an electric motor-generator 190 having a stator 192 and a rotor 194. A torque transfer cross-drive pinion gear 196 is connected drivably through a sleeve shaft to the rotor 194. Pinion gear 196 engages a torque transfer idler gear 198 of the transfer drive. Power output gear 200 is engaged with the torque transfer gear 198. The driveshaft for the front traction wheels for the vehicle is shown at 202.

The torque transfer idler gear 198 is located on a third axis that is intermediate, and disposed in parallel relationship with respect to, the axis of shaft 202 and the axis of an engine driven torque transmission torque output shaft 204, which is the torque input shaft for the torque transfer case. A 4×4 coupler clutch 206, when engaged, drivably connects torque transfer idler gear 198 to a second torque transfer idler gear 208, which drivably engages torque output gear 210 for the driveshaft 215 for the vehicle rear traction wheels. The pitch diameter of gear 208 is smaller than the pitch diameter of gear 198.

A range coupler clutch assembly 212 includes a first clutch 214 for directly connecting pinion gear 196 to the engine driven power input shaft 204. It includes also a second coupler clutch 216 for selectively connecting engine driven torque input shaft 204 to gear 210.

With clutch 214 of the range coupler 212 engaged, engine and motor driving power can be distributed to the front traction wheels. The engine power is supplemented with electric motor power. If the 4×4 coupler clutch 206 is disengaged at this time, power delivery to the rear traction wheel is interrupted. If at this time clutch 206 is engaged, a 4×4 operating mode is established as power is delivered to both the front and rear traction wheels.

If the range coupler clutch 216 is engaged and range coupler clutch 214 is disengaged, a higher gear ratio is established as power is delivered to the rear traction wheels. If at this time 4×4 coupler clutch 206 is engaged, power is delivered to gear 198 and to the driveshaft 202 for the front traction wheels.

With the configuration of FIG. 7, the drive characteristics of the embodiment of FIG. 2 can be achieved without the necessity for using a drive chain and without the necessity for a planetary gear unit. Thus, by replacing the two axis system of the embodiment of FIG. 2 with the three axis system of the embodiment of FIG. 7, the overall assembly is simplified, which makes the embodiment of FIG. 7 easier to package in an automotive vehicle powertrain configuration. The 4×4 coupler of the embodiment of FIG. 7 is of a simpler design than the corresponding 4×4 coupler of the embodiment of FIG. 2 since it forms a part of a simple torque transfer gear rather than a planetary gear assembly.

A further advantage of the embodiment of FIG. 7 arises from the use of a simpler range coupler 212, rather than the complex range coupler of the embodiment of FIG. 2.

The range coupler 212 of the embodiment of FIG. 7 is easily packaged between drive gears 196 and 210, rather than between the motor-generator and the multiple ratio transmission. In the range coupler design of the embodiment of FIG. 2, a relatively large torque input clutch drum is needed. The clutch drum is connected to the engine-driven transmission output shaft. To engage the range coupler clutches in the embodiment of FIG. 2 it is necessary to provide a shifting fork and shift sleeve assembly that must be journalled about the range coupler outer clutch member, and it must extend radially inward to reach the engaging clutch elements to establish a driving connection with the rotor of the motor-generator and the power output shaft 80. In contrast, the range coupler design of the embodiment of FIG. 7 eliminates the need for a complex range coupler clutch engagement and release mechanism. Further, its strategic location between gears 196 and 210 make it possible to reduce the overall axial dimensions of the design.

Figure 8:
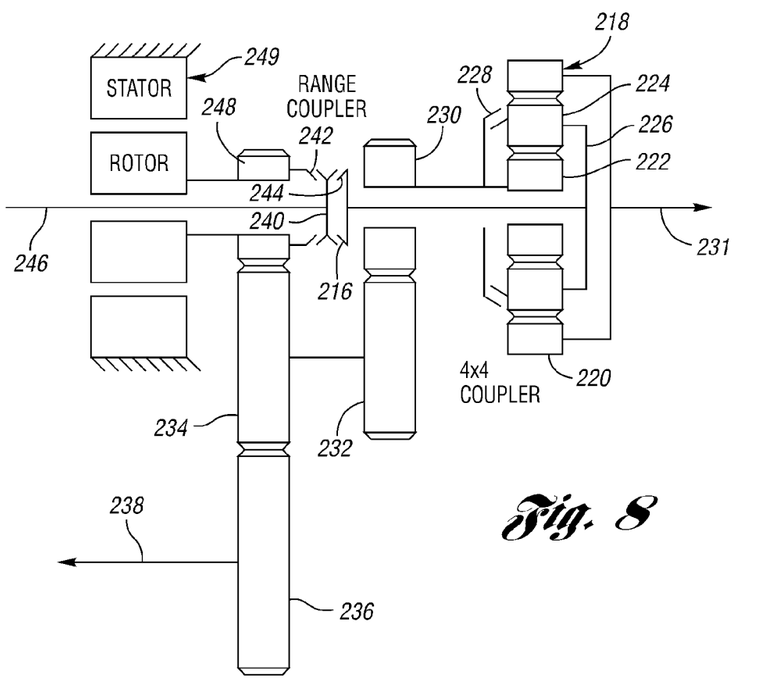
FIG. 8 is a schematic representation of a hybrid electric vehicle powertrain comprising a layshaft all-wheel drive configuration with drive characteristics similar to the drive characteristics of the embodiment of FIG. 4.

The embodiment of FIG. 8 has drive characteristics similar to the embodiment of FIG. 4. Each design includes a torque splitter gear unit. The torque splitter gear unit for the embodiment of FIG. 8 is shown at 218. It includes planetary gearing comprising ring gear 220, sun gear 222 and planet gears 224 rotatably supported by planetary carrier 226. A range coupler clutch 228 drivably connects sun gear 222 and carrier 226 to lock up the torque splitter gear unit, thereby establishing a direct driving connection between torque transfer gear 230 and driveshaft 231, which delivers power to the rear traction wheels. If the 4×4 coupler clutch 228 is disengaged, the embodiment of FIG. 8 functions as an all-wheel drive powertrain as the torque splitter gear unit 218 delivers torque to driveshaft 231 and to drive gear 230. Gear 230 drivably engages torque transfer idler gear 232, which is coupled drivably to lower ratio torque transfer gear 234, which delivers torque to driveshaft 238 for the front traction wheels.

A range coupler clutch assembly 240 comprises a first clutch 242 and a second clutch 244. This makes it possible to have two driving ratios for the front traction wheels. If clutch 242 is engaged and clutch 244 is disengaged, a low driving ratio for the front traction wheels is established as engine driven shaft 246 drives gear 248, which meshes with idler gear 234. Motor generator torque is directly delivered to gear 248. If the transmission controller will permit clutch 242 to be engaged when clutch 244 is disengaged, a low range for front-wheel drive would be available. If clutch 244 is applied and clutch 242 is released, an all-wheel drive mode is available as the torque splitter gear unit 218 simultaneously delivers power to each driveshaft 231 and 238.

When the clutch 228 for the 4×4 coupler is engaged, the torque splitter gear unit is locked up and torque is delivered directly through the locked up planetary gearing to the rear driveshaft 231 as well as to the front traction wheel driveshaft 238. Torque is delivered from drive gear 230 to torque transfer gears 232 and 234 to driveshaft 238.

Figure 9:
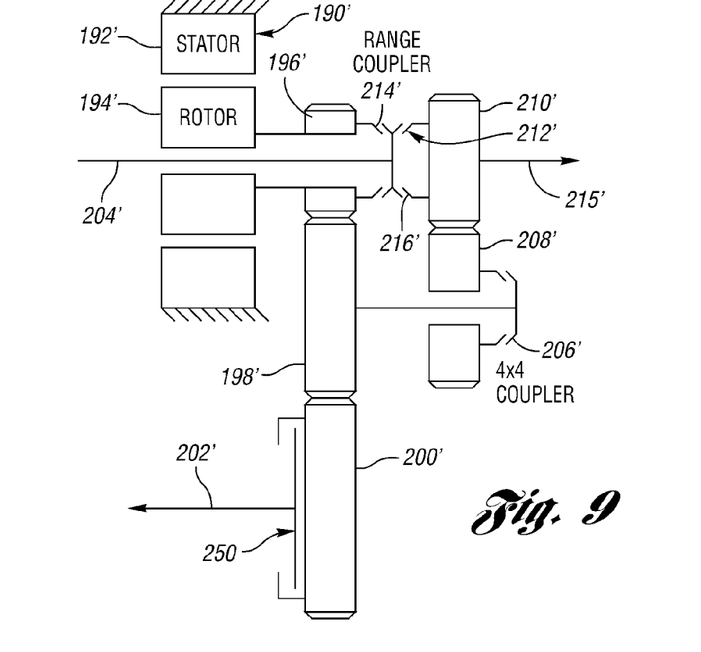
FIG. 9 is a schematic representation of a hybrid electric vehicle powertrain comprising a layshaft four-wheel drive configuration with drive characteristics similar to the drive characteristics of the embodiment of FIG. 2.

The embodiment of FIG. 9 has elements common to the embodiment of FIG. 2 and it has the same operating characteristics. The embodiment of FIG. 9, however, includes a rear clutch generally indicated at 250. Clutch 250 selectively connects front traction wheel driveshaft 202' with power output gear 200'. The introduction of clutch 250 makes it possible for the engine to be started using the motor-generator 190' as a source of engine cranking torque during an engine start operation.

The clutch 250 also will permit the engine to drive the motor-generator 190' for the purpose of charging the battery. This may be done while the clutches for the range coupler 212' are released and the clutch 206' of the 4×4 coupler is released. The clutch 250 is disengaged at this time. Thus, torque is not delivered to either the front traction wheel driveshaft 202' or the rear traction wheel driveshaft 215'.

If the powertrain is delivering torque to the traction wheels when the engine is commanded to start using motor power, the clutch 250 is allowed to slip. The motor has reserve capacity to allow engine cranking as it is delivering power to the traction wheels.

The numerals used in the illustration of the embodiment of FIG. 9 are the same as the numerals in the illustration of the embodiment of FIG. 7, except that prime notations are used for the numerals in FIG. 9 for elements that correspond to elements in the embodiment of FIG. 7.

Figure 10:
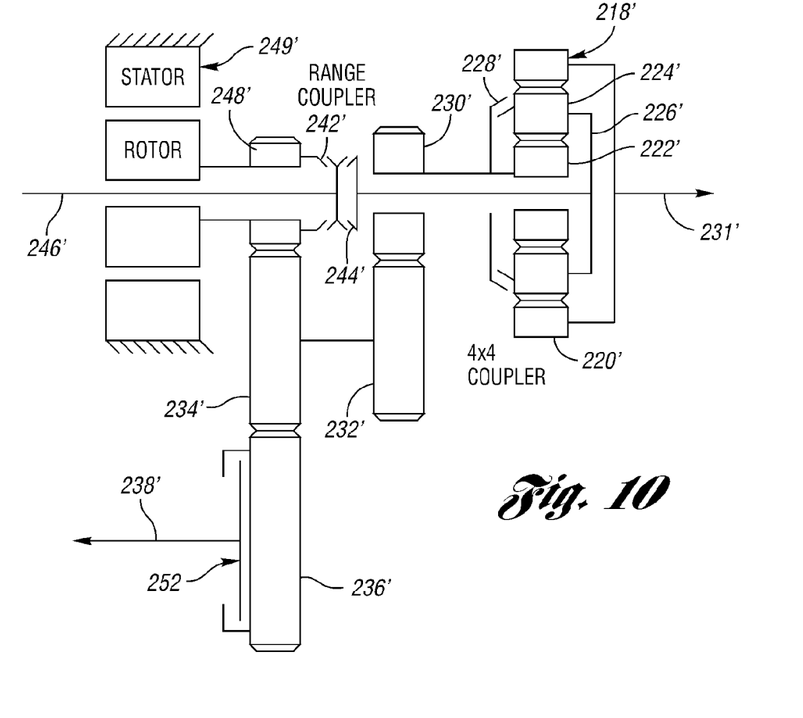
FIG. 10 is a schematic representation of a hybrid electric vehicle powertrain comprising a layshaft all-wheel drive configuration with drive characteristics similar to the drive characteristics of the embodiment of FIG. 4.

FIG. 10 is similar to the embodiment of FIG. 8 and has operating characteristics that are the same as the operating characteristics of the embodiment of FIG. 8. The numerals used in the illustration of the embodiment of FIG. 10 carry prime notations, which correspond to corresponding numerals used in the illustration of the embodiment of FIG. 8.

In FIG. 10, the driveshaft for the front traction wheels is selectively connected to power output gear 236' by rear clutch 252. Thus, the front traction wheels can be disconnected from the engine driven shaft 246' when the motor-generator is being driven by the engine and battery charging is desired. This is done when clutch 242' of the range coupler is engaged. Further, the presence of the clutch 252 will permit the engine to be started using the motor-generator as a motor as rotor torque is distributed through clutch 242' to the shaft 246'. As in the case of clutch 250 of the embodiment of FIG. 9, the clutch 250 can be slipped if the engine is commanded to start while the motor-generator is delivering torque to the wheels. The motor-generator has reserve capacity to do this.

Although embodiments of the invention have been disclosed, it will be apparent to a person skilled in the art that modifications may be made without departing from the scope of the invention. All such modifications and equivalents thereof are intended to be covered by the following claims.

What is claimed:

1. A hybrid electric vehicle powertrain for an automotive vehicle comprising an engine, a first traction wheel and axle assembly, a second traction wheel and axle assembly, a power transmission drivably connected to the engine and a torque transfer case with a transfer case torque input shaft connected drivably to a transmission torque output shaft, the powertrain comprising:

an electric motor-generator;

a first transfer case torque output shaft connected drivably to the first traction wheel and axle assembly;

the electric motor-generator and the first transfer case torque output shaft being assembled on a common first axis;

a second transfer case torque output shaft disposed on a second axis that is offset from the first axis;

the second traction wheel and axle assembly being drivably connected to the second transfer case torque output shaft;

a torque cross-drive mechanism drivably connecting the motor-generator to the second transfer case torque output shaft;

the torque cross-drive mechanism comprising a torque output gear drivably connected to the second transfer case torque output shaft, at least one torque input gear drivably connected to the motor-generator and at least one idler gear drivably connecting the one torque input and torque output gears;

the one torque input gear of the cross-drive mechanism being journalled on the first axis;

the torque output gear of the cross-drive mechanism being journalled on the second axis; and the at least one idler gear being journalled on a third axis that is offset from the first and second axes.

2. The hybrid electric vehicle powertrain set forth in claim 1 wherein the torque cross-drive mechanism comprises a second torque input gear of different pitch diameter than the one torque input gear;

a second idler gear drivably engaging the second torque input gear of the cross-drive mechanism; and a range coupler mechanism including a first range coupler clutch selectively connecting the transfer case torque input shaft to the one torque input gear and a second range coupler clutch selectively connecting the transfer case torque input shaft to the second torque input gear.

3. The hybrid electric vehicle powertrain set forth in claim 2 including a four-wheel drive clutch selectively connecting the first and second idler gears to establish a four-wheel drive mode.

4. The hybrid electric vehicle powertrain set forth in claim 3 wherein the four-wheel drive clutch is located on the third axis adjacent the second idler gear.

5. The hybrid electric vehicle powertrain set forth in claim 2 wherein the first and second range coupler clutches are located on the first axis intermediate the one and the second torque input gears.

6. The hybrid electric vehicle powertrain set forth in claim 5 wherein the four-wheel drive clutch is located on the third axis adjacent the second idler gear.

7. The hybrid electric vehicle powertrain set forth in claim 2 wherein the second torque input gear is drivably connected to the first traction wheel and axle assembly and the second transfer case torque output shaft is drivably connected to the second traction wheel and axle assembly.

8. The hybrid electric vehicle powertrain set forth in claim 2 wherein the driving connection between the second transfer case torque output shaft and the torque output gear of the cross-drive mechanism includes a disconnect clutch for interrupting power delivery selectively to the second traction wheel and axle assembly.

9. The hybrid electric vehicle powertrain set forth in claim 1 wherein the driving connection between the second transfer case torque output shaft and the torque output gear of the cross-drive mechanism includes a disconnect clutch for interrupting power delivery selectively to the second traction wheel and axle assembly.

10. A hybrid electric vehicle powertrain for an automotive vehicle comprising an engine, a first traction wheel and axle assembly, a second traction wheel and axle assembly, a power transmission drivably connected to the engine and a torque transfer case with a transfer case torque input shaft connected to a transmission torque output shaft, the powertrain comprising:

an electric motor-generator;

a first transfer case torque output shaft drivably connected to the first traction wheel and axle assembly;

a second transfer case torque output shaft connected drivably to the second traction wheel and axle assembly;

the electric motor-generator and the first transfer case torque output shaft being on a common first axis;

at least one torque transfer case torque input gear on the first axis;

the second torque transfer case torque output shaft being on a second axis;

a range coupler clutch assembly connecting the motor-generator to the torque transfer case torque input shaft;

at least one idler gear defining in part a driving connection between the one torque transfer case torque input gear and the second torque output shaft;

a torque splitter gear unit on the first axis comprising a first gear element connected to the first torque transfer case torque output shaft;

the range coupler clutch assembly selectively connecting a second gear element of the torque splitter gear unit to the transfer case torque input shaft; and a geared driving connection between a third gear element of the torque splitter gear unit and the second transfer case torque output shaft whereby an all-wheel drive mode is established.

11. The hybrid electric vehicle powertrain set forth in claim 10 including a four-wheel coupler clutch for locking-up gear elements of the torque splitter gear unit whereby a four-wheel drive mode is established.

12. The hybrid electric vehicle powertrain set forth in claim 11 including a disconnect clutch for interrupting power delivery selectively to the second traction wheel and axle assembly.

13. The hybrid electric vehicle powertrain set forth in claim 10 wherein the geared connection between the third gear element of the torque splitter gear unit and the second transfer case torque output shaft comprises a second torque transfer case torque input gear; and a second idler gear drivably connecting the second torque transfer case torque input gear to the one idler gear, the idler gears being located on a third axis.

14. The hybrid electric vehicle powertrain set forth in claim 13 wherein the pitch-diameters of the one and the second torque transfer case torque input gears are different whereby either of two drive ranges are available.

15. The hybrid electric vehicle powertrain set forth in claim 10 including a disconnect clutch for interrupting power delivery selectively to the second traction wheel and axle assembly.

* * * * *